United States Patent [19]
Robberts

[11] Patent Number: 5,705,060
[45] Date of Patent: Jan. 6, 1998

[54] VESSEL FOR MIXING OR SEPARATING FLOWING MEDIA

[75] Inventor: Lennart Robberts, Gävle, Sweden

[73] Assignee: Gavle Galvan Tryckkarl AB, Gavle, Sweden

[21] Appl. No.: 714,092

[22] PCT Filed: Mar. 22, 1995

[86] PCT No.: PCT/SE95/00298

§ 371 Date: Sep. 17, 1996

§ 102(e) Date: Sep. 17, 1996

[87] PCT Pub. No.: WO95/25584

PCT Pub. Date: Sep. 28, 1995

[30] Foreign Application Priority Data

Mar. 24, 1994 [SE] Sweden ................................. 9400999

[51] Int. Cl.[6] ................................................ B01D 21/26
[52] U.S. Cl. ................................ 210/198.1; 210/512.1; 210/512.3; 210/221.2; 366/165.1; 366/161.2; 366/165.3
[58] Field of Search ........................ 210/512.1, 512.3, 210/221.2, 198.1; 366/165.1, 165.2, 165.3

[56] References Cited

U.S. PATENT DOCUMENTS

| 4,087,862 | 5/1978 | Tsien. |
| 4,292,259 | 9/1981 | Roth et al.. |
| 4,389,312 | 6/1983 | Beard. |
| 5,470,465 | 11/1995 | Moorehead et al. ............. 210/512.1 |

FOREIGN PATENT DOCUMENTS

| 0 223 718 | 5/1987 | European Pat. Off.. |
| 0 330 028 | 8/1989 | European Pat. Off.. |
| 474 712 | 9/1991 | Sweden. |
| 505 652 | 5/1971 | Switzerland. |
| 84-27955/05 | 3/1983 | U.S.S.R.. |

*Primary Examiner*—David A. Reifsnyder
*Attorney, Agent, or Firm*—Young & Thompson

[57] ABSTRACT

A vessel for mixing flowing media or for extracting heavy constituents from flowing media generates a natural vortex in the media flowing in the vessel. The vessel cross-section has at least one increase in cross-sectional area within the region of the generated natural vortex.

10 Claims, 2 Drawing Sheets

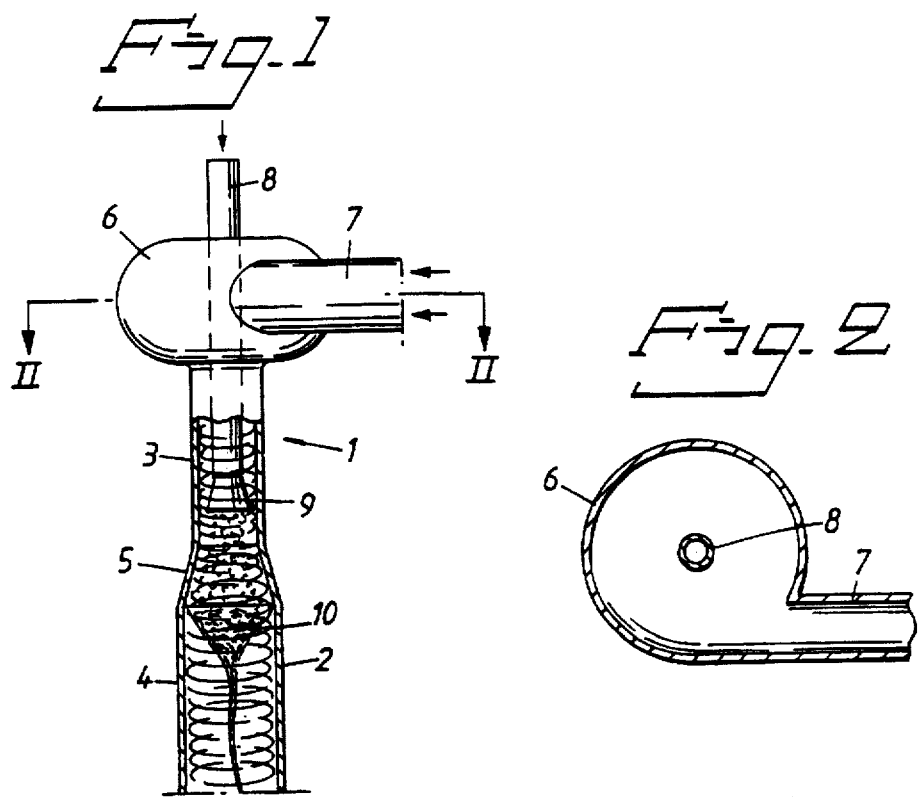
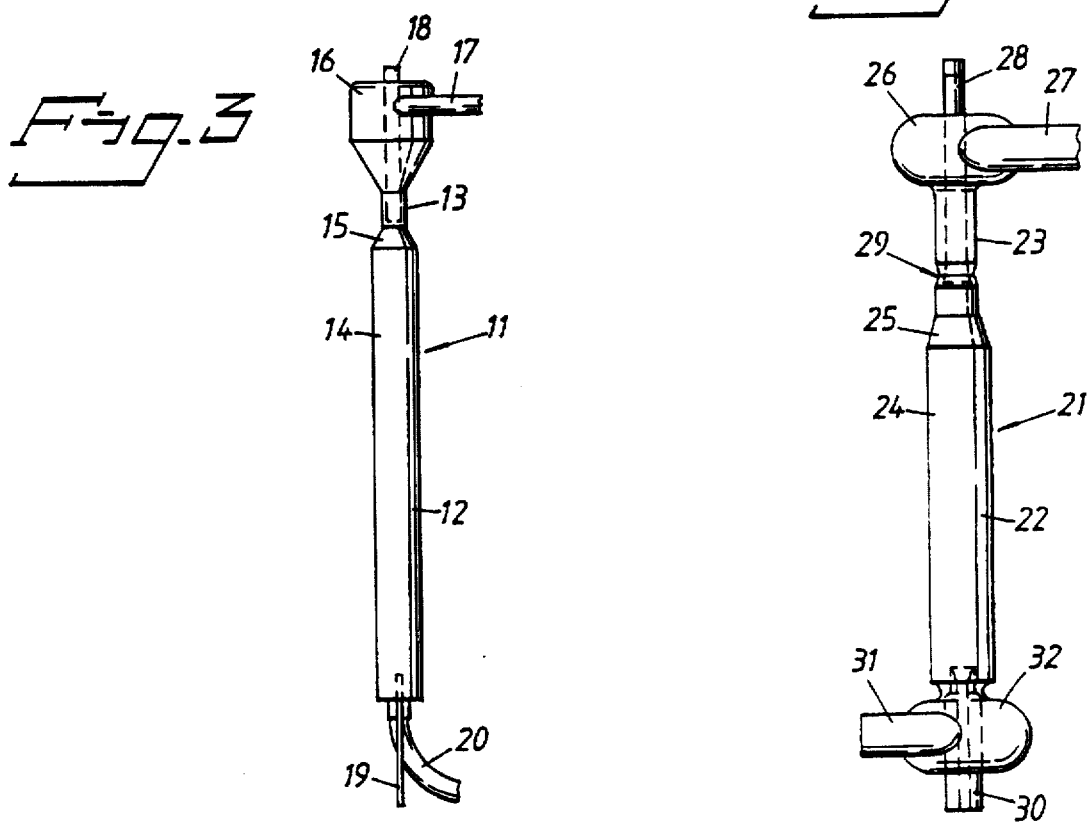

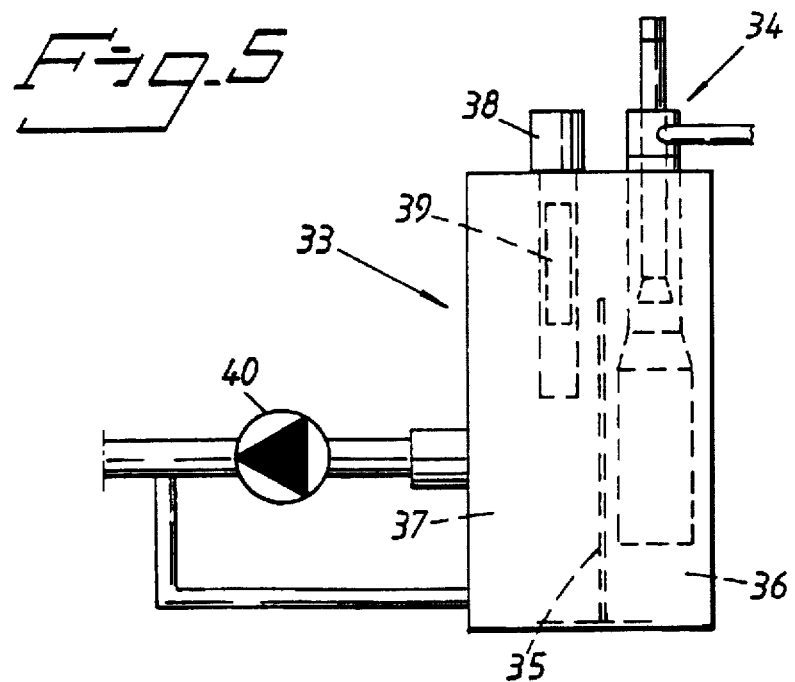
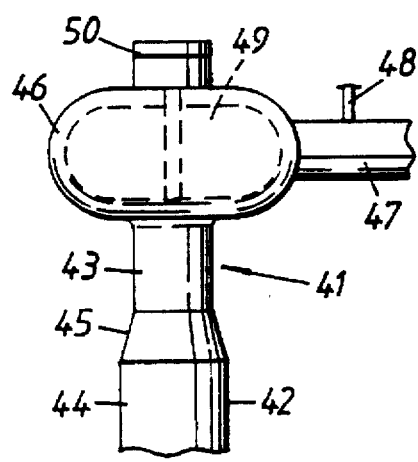
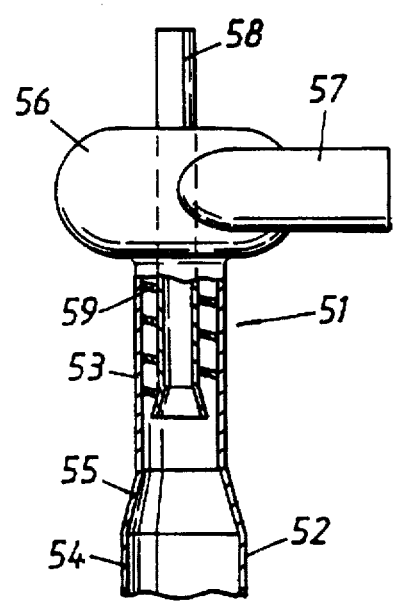

VESSEL FOR MIXING OR SEPARATING FLOWING MEDIA

The present invention relates to a vessel for mixing or separating flowing media. The invention is particularly intended for application in water purification plants.

It is known to cleanse drinking water of hydrogen sulphide, iron compounds and manganese compounds for instance, by adding oxygen to the water prior to delivering the water to the customer or consumer. A device for mixing air with a volume of flowing water with the aid of an ejector is known to the art, for instance from SE-B-464 712. The known device is placed in a hydrophore, and it is necessary for the device outlet to discharge into the air-filled part of the hydrophore. This condition naturally limits the area of use of the known device.

An object of the present invention is to provide a vessel for mixing flowing media or for separating or extracting heavy constituents from flowing media which will allow large variations in the pressure conditions that prevail at its outlet and which will enable the volume of flowing media delivered to the vessel to be accurately controlled.

This object is achieved in accordance with the invention by means of a vessel for mixing flowing media or extracting heavy constituents from flowing media which is characterized by the presence of means for generating a natural vortex in the media flowing in the vessel, and is further characterized in that the cross-section of the vessel has at least one abrupt increase in size within the region of the generated natural vortex. This construction results in strong disturbance of the natural vortex at the location of the increase in cross-section, resulting in a region of strong turbulent flow. This region constitutes a particularly effective mixing zone, which also has a relatively limited extension in the axial direction of the arrangement. The natural vortex occurs immediately downstream of the mixing zone and any particles or the like present in the flowing media will be collected in the centre of the vortex and can be separated therefrom with the aid of a central outlet which communicates with the vortex centre.

According to one preferred embodiment, the vessel is rotationally symmetrical in shape and has a first end at which media is delivered and a second end from which media is discharged, and the natural vortex generating means has the form of a delivery conduit for at least one flowing medium which connects tangentially to the rotationally symmetrical vessel at its inlet end.

In the case of one advantageous variant of a vessel with which water to be oxygenated is delivered to the inlet end of the vessel, there is provided a tube through which an oxygen-containing gas, such as air, oxygen gas or ozone is introduced and which extends centrally and axially through the end wall of the vessel at the vessel inlet end and opens out in the vessel at a point upstream of the location of the abruptly increased cross-sectional area. The gas delivery tube may advantageously have a flared discharge part or mouth.

The invention will now be described with reference to the accompanying drawings, in which FIG. 1 is a schematic partially cut-away side view of a first embodiment of an inventive vessel;

FIG. 2 is a sectional view taken on the line II—II in FIG. 1;

FIG. 3 is a side view of a second embodiment of an inventive vessel;

FIG. 4 is a side view of a third embodiment of an inventive vessel;

FIG. 5 is a side view of a fourth embodiment of an inventive vessel; and

FIGS. 6 and 7 are respectively side views of a fifth and a sixth embodiment of an inventive vessel.

The vessel 1 illustrated in FIGS. 1 and 2 includes a tube 2 which has an upper tubular part 3, a lower tubular part 4, whose diameter is larger than the part 3, and a transition part 5 which connects the upper and the lower tube parts together. Connected to the upper end of the upper tube part 3 is a cylindrical inlet chamber 6 into which a tangentially directed inlet conduit 7 opens out. The vessel also includes a centrally positioned second tube 8 which has a smaller diameter than the tube part 3 and which extends axially through the inlet chamber 6 slightly down into the upper tube part 3. The bottom end of the second tube 8 has a flared outlet part or mouth 9.

When the vessel 1 is to be used to oxygenate water, the water is delivered under pressure through the inlet conduit 7. Because the water flows into the inlet chamber tangentially, the water is caused to rotate and flow through the tubular part 3 with tubular motion. As the water flows past the flared part 9 of the tubular part 3, the throughflow area decreases and the flow rate of the water increases. The throughflow area increases markedly downstream of the flared part 9, causing a lower pressure to be generated locally in the region beneath the mouth or outlet orifice of the second tube 8. When the tube 8 communicates with air under atmospheric pressure, air will thus be sucked into the tubular part 3.

It has been observed that a natural vortex 10 is formed in the lower tube part 4. By natural vortex is meant the types of vortices that have tornado-like flow and which are generated naturally in rivers, waterways, downstream of a flow obstruction, such as stones or the like, for instance. In vortices of this nature, the medium will flow helically in a funnel-shaped flow body, as indicated by the flow body 10 in FIG. 1.

It has been also been observed that a strong turbulent flow occurs in the central part of the junction part 5, at the same time as a thin layer of water flows helically around the tube wall. It should be noted that it is the water from the surface of the generated vortex 10 that is mixed in the turbulent region with the air delivered through the tube 8. It has been observed in this respect that the helically flowing water in the tube part 4 outside the vortex is clear, which indicates that the mixture of air in the water has taken place in the turbulent region and therewith within a very limited part of the vessel 1. It has also been observed that the flow process is not changed appreciably when the flow rate of the water delivered through the inlet conduit 7 varies. Although not shown, the vessel 1 also includes an outlet in the form of an outlet conduit. It has been observed that the described flow process also occurs when the counter-pressure varies greatly, i.e. variations in the local pressure exerted by the water into which the outlet conduit discharges. More specifically, it has been observed that when the outlet conduit of a vessel 1 discharges in the bottom of a drainage tank, the aforesaid flow process will take place essentially independent of level changes in the water in the tank.

It has also been observed that the aforesaid flow process will also take place when air under pressure is delivered through the second tube 8. This enables the vessel 1 to be used advantageously to deliver ozone for the oxygenation of water. When oxygen in the form of ozone is delivered to the vessel, bacteria present in the water are killed because of the toxicity of the ozone and the degradation of COD, in addition to purifying the water by oxidation of the iron compounds and manganese compounds present in the water.

Furthermore, because the mixing zone is short, the ozone, which is extremely reactive, is utilized to a maximum to this end. When using the vessel 1 for mixing ozone with the water, the ozone consumption can be greatly reduced in comparison with known ozone mixing systems using over-pressures and static mixers. Since it is not necessary to use surplus quantities of ozone in order to ensure that the desired degree of purification is achieved, it is unnecessary to use large carbon filters to render innocuous any surplus ozone that may occur, as distinct to the earlier mentioned known ozone mixing systems.

FIGS. 3 and 4 illustrate further embodiments of an inventive vessel, these embodiments differing from the FIG. 1 embodiment primarily by virtue of having central outlets into which the natural vortex opens and which when the vessels are in use form the part of larger cross-sectional area.

FIG. 3 illustrates a vessel 11 which includes a tube 12 having an upper tubular part 13, a transition part 15 and a bottom tubular part 14, these parts corresponding fully with the parts 2–5 of the vessel 1 shown in FIG. 1. The vessel also includes an inlet chamber 16 having an upper cylindrical part in which a tangentially extending inlet conduit 17 discharges, and a lower funnel-shaped part which further favours the occurrence of a natural vortex in the tube 12, said inlet chamber being connected to the upper tube part 13. The vessel 11 also includes a second delivery tube 18 which corresponds to the tube 8 in the vessel 1, with the exception that the tube 18 has no flared mouth part. As before mentioned, the vessel 11 has a central outlet in the form of a narrow outlet pipe 19 at the bottom end of the tube 12. This tube enables particles or fractions of higher specific gravity than water collecting in the centre of the vortex to be separated from the water in the vessel. The tube 12 may also have an outlet conduit 20 for water flowing outside the vortex, this outlet conduit being positioned radially outside the outlet pipe 19 in the bottom of the tube 12. This outlet conduit may be connected to a hydrophore for instance.

As with the earlier described vessels 1 and 11, the vessel 21 shown in FIG. 4 includes a tube 22 having an upper part 23, a bottom part 24 and a transition part 25, wherein the upper end of the upper part 23 is connected to an inlet chamber 26 having a tangentially directed inlet conduit 27. A centrally positioned delivery tube 28 having a flared outlet end, or mouth, extends through the inlet chamber and slightly down into the upper tube part 23. The upper tube part 23 has a cross-section 29 of double-cone configuration and has a smaller cross-sectional area than the remaining parts of said upper tube part 23. The delivery tube is conveniently attached to the inlet chamber 26 in a manner which allows the tube to be moved axially. This enables the smallest cross-sectional area, i.e. the area between the outer surface of the delivery tube 28 and the inner surface of the upper tubular part 23, to be varied by displacing the flared part of the delivery tube. This construction of the vessel 21 enables the smallest throughflow area to be optimized for different flows in the inlet conduit 27. The vessel 21 illustrated in FIG. 4 also includes an outlet chamber 32 having a tangentially directed outlet conduit 31 and an axially extending and centrally positioned outlet pipe 30, which extends through the outlet chamber 32 and discharges in the bottom end of the tube 22. The mouth of the outlet pipe 30 has a funnel-shaped configuration. The outlet chamber 32 and the funnel-shaped mouth of the outlet pipe 30 favour the occurrence of a natural vortex in the vessel 22 and contribute to the stability of a generated natural vortex.

Shown in FIG. 5 is a tank 33 in which a vessel 34, corresponding essentially to the vessel shown in FIG. 1, is placed. A partition wall 35 extends from the bottom of the tank upwards and terminates short of the top of the tank, and divides the tank into two separate compartments 36, 37. The interior of the tank is connected to ambient atmosphere by means of a valve 38. When the vessel 34 is in operation, purified water flows from the vessel upwards in the compartment 36 and over the edge of the partition wall 35 and falls down into the compartment 37. The purified water will be deaerated as it runs over the edge of the partition wall and any excess air will be discharged to the surroundings through the valve 38. In order to achieve desired ventilation of oxygen, carbon dioxide and hydrogen sulphide, the water level in the compartment 37 shall lie beneath the edge of the partition wall 35 and consequently, in operation, the same quantity of water as that delivered from the compartment 36 shall be pumped from the compartment 37, with the aid of a pump 40 provided to this end. The valve 38 is conveniently arranged to close when the water in the tank exceeds a given level, in the illustrated case by means of a float 39 which functions to close the valve.

FIG. 6 is a partial view of a further embodiment of an inventive vessel. The vessel 41 includes a tube 42 having an upper tube part 43, a bottom tube part 44, a transition part 45, an inlet chamber 46, an inlet conduit 47 and a delivery conduit 48. The vessel 41 also includes an impeller 49 mounted in the inlet chamber 46 and rotated by a motor 50. The impeller constitutes the main component for generating a natural vortex in the tube 42. The delivery tube 48 discharges into the inlet conduit 47. In a manner similar to that described with reference to the vessel 1, there is generated in the vessel 41 in the region of the transition part 45 a mixing zone which ensures effective mixture of the air that is sucked into or injected into the inlet conduit with the water flowing in through the tube 42.

The vessel 51 shown in FIG. 7 is, in principle, of the same construction as the vessel 1 shown in FIG. 1, with the components 52–58 in FIG. 7 corresponding to the components 2–8 of the vessel 1. Guide means 59 in the form of a helical bar extends between the outer surface of the delivery tube 58 and the inner surface of the tube part 53, within the region of the tube 58. This guide element ensures that the water will flow helically in the tube 52, and amplifies said flow. According to one variant of this embodiment, the water inlet conduit may surround the delivery tube 58 coaxially, and the helical motion of the water flowing in the tube 52 may be generated totally with the aid of guide means.

The various embodiments have been described above with the assumption that the vessels are positioned vertically. However, it is not necessary for the vessels to stand vertically, but may be placed in any desired position without jeopardizing the function of the vessels. Although only air and ozone have been mentioned as oxygenating media, it will be understood that oxygen gas may also be used.

The described vessels can be used for a number of other purposes than that of purifying water. For instance, the vessel can be used to promote chemical reactions between two media by mixing said media, which may be in a liquid or a gas state, or simply for mixing such media together. The vessel can also be used to add to the water copper or silver ions for instance, these ions having a bacteria-killing effect.

It will also be understood that the described and illustrated embodiments of the invention can be modified within the scope of the invention. For instance, vortex generating means may be placed solely in the outlet part of the vessel instead of in its inlet part, and different types of vortex generating means may be provided in the inlet part and the outlet part of the vessel. Furthermore, the transition part between those tubular parts of the vessel that have different diameters may be given a smaller axial extension and may even be comprised of a ring-shaped horizontal wall which connects said parts together. The invention is therefore limited solely by the content of the following claims.

I claim:

1. A vessel for treatment of liquid comprising:
   an inlet chamber for liquid,
   a first tubular part immediately downstream of the inlet chamber,
   means to give the liquid a rotational movement around an axis of the first tubular part when entering said first tubular part,
   a second tubular part downstream of said first tubular part and having a larger diameter than said first tubular part, said second tubular part being connected to the first tubular part via a transition part an outer conduit for liquid; and
   an inlet conduit for gas connected to the vessel upstream of said transition part, wherewith a natural vortex in the media flowing in the vessel is generated in said second tubular part.

2. A vessel according to claim 1 further comprising means located in the first tubular part for stabilizing the rotational movement of the liquid in said part.

3. A vessel according to claim 1 wherein said means to give the liquid rotational movement comprises a delivery conduit for liquid connected tangentially to the vessel at the inlet chamber.

4. A vessel according to claim 1 further comprising a rotationally driven impeller in at least one of the inlet chamber and an outlet chamber downstream of said second tubular part.

5. A vessel according to claim 1 wherein said means to give the liquid a rotational movement comprises guide means which force the liquid to flow in a helical path.

6. A vessel according to claim 1 further comprising a centrally positioned tube for delivering oxygen-containing gas which extends axially through the inlet chamber and discharges in the vessel upstream of the transition part.

7. A vessel according to claim 6 wherein said centrally positioned tube has a flared outlet.

8. A vessel according to claim 6 wherein the centrally positioned tube is axially movable.

9. A vessel according to claim 1 further comprising an outlet downstream of said second tubular part which comprises a centrally placed outlet pipe the outlet conduit being radially outside the outlet pipe.

10. A vessel according to claim 1 conduit further comprising a vortex generating means at the outlet downstream of said second tubular part.

* * * * *